(12) United States Patent
Thiebot et al.

(10) Patent No.: US 11,715,319 B2
(45) Date of Patent: Aug. 1, 2023

(54) DERMATOGLYPH DETECTOR

(71) Applicant: IDEMIA IDENTITY & SECURITY FRANCE, Courbevoie (FR)

(72) Inventors: Alain Thiebot, Courbevoie (FR); Jean Beaudet, Courbevoie (FR); Michel Cruchaga, Courbevoie (FR); Aurélie Moriceau, Courbevoie (FR); Alexis Sireta, Courbevoie (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 100 days.

(21) Appl. No.: 17/549,292

(22) Filed: Dec. 13, 2021

(65) Prior Publication Data
US 2022/0189197 A1    Jun. 16, 2022

(30) Foreign Application Priority Data

Dec. 14, 2020   (FR) ...................................... 2013217

(51) Int. Cl.
*G06V 40/13*    (2022.01)
*G06V 40/12*    (2022.01)
*G06V 40/40*    (2022.01)

(52) U.S. Cl.
CPC .......... *G06V 40/13* (2022.01); *G06V 40/1382* (2022.01); *G06V 40/1394* (2022.01); *G06V 40/40* (2022.01)

(58) Field of Classification Search
CPC .............. G06V 40/13; G06V 40/1382; G06V 40/1394; G06V 40/40; G06V 40/1306
See application file for complete search history.

(56) References Cited

U.S. PATENT DOCUMENTS

| 10,810,404 B2* | 10/2020 | Rowe | G06V 40/1394 |
| 2004/0019292 A1* | 1/2004 | Drinan | A61B 5/053 |
| | | | 600/547 |
| 2006/0159314 A1* | 7/2006 | Foundeur | G06V 40/13 |
| | | | 382/124 |

(Continued)

OTHER PUBLICATIONS

Dupre, Antoine et al., "Novel Approach for Analysis and Design of High-Speed Electrical Impedance Tomographic System for Void Fraction Measurements in Fast Two-Phase Flows," IEEE Sensors Journal, Jul. 15, 2017, pp. 4472-4482 (11 pages), vol. 17, Issue No. 14, IEE Service Center, New York, NY, US (XP-011654475).

*Primary Examiner* — John B Strege
(74) *Attorney, Agent, or Firm* — Muncy, Geissler, Olds & Lowe, P.C.

(57) ABSTRACT

A dermatoglyph detector includes a detection circuit and an electronic processor unit. The detection circuit includes an electrically conductive thin film in which there are formed both electrodes that are arranged to come into contact with the skin of a portion of a human body and also conductive tracks connecting the electrodes to the processor unit. The processor unit is arranged to determine electrical characteristics of the body portion extending between each pair of electrodes in contact with the skin, and to execute a computer program for acting on the basis of the determined electrical characteristics to distinguish between an authentic body portion and a fake body portion. The detection circuit includes at least two track segments of different shapes between two calibration terminals so as to present an impedance ratio that is not equal to unity.

14 Claims, 2 Drawing Sheets

(56) References Cited

U.S. PATENT DOCUMENTS

2019/0107917 A1\* 4/2019 Bohannon .......... G06V 30/1423
2019/0274579 A1\* 9/2019 Lee ..................... A61B 5/6824
2023/0034956 A1\* 2/2023 Gudivada .......... G06V 40/1306

\* cited by examiner

DERMATOGLYPH DETECTOR

The present invention relates to the field of biometric recognition, and more particularly to detecting fraud while performing recognition on a representation of dermatoglyphs. Dermatoglyphs are the figures formed by papillary ridges on the skin, commonly referred to as "fingerprints" when on fingers.

BACKGROUND OF THE INVENTION

Dermatoglyph detectors are known that include a fraud detection circuit connected to an electronic processor unit. The fraud detection circuit comprises electrodes that are connected by conductive tracks to the electronic processor unit and that are for putting into contact with the skin of a human body portion, usually a finger, in order to cause a current at a predetermined voltage to pass through the finger between each pair of electrodes in contact with the finger.

The detector circuit is generally in the form of an electrically conductive film covering the surface of a substrate and presenting a geometrical pattern that defines the tracks and the electrodes. The term "thin" should be understood as presenting thickness of less than 5 micrometers (μm), and more commonly less than 400 nanometers (nm).

By measuring the magnitude of the current flowing through the portions of the finger that extend between each pair of electrodes, it is possible to determine a corresponding set of complex impedances and to apply the various different impedances as determined in this way to an impedance model in order to distinguish between a real, authentic finger and a counterfeit finger reproducing authentic dermatoglyphs, but made of synthetic material, for example.

It is found that detecting fake fingers presents results that are too irregular when using present detection circuits.

OBJECT OF THE INVENTION

A particular object of the invention is to improve the performance biometric sensors, at least in part.

SUMMARY OF THE INVENTION

The impedance that is determined depends specifically on the impedance of the detection circuit, in particular on the length, on the width, and on the thickness of the tracks and electrodes, on the grades of material used, on the heat treatments that have been performed, Unfortunately, manufacturing tolerances give rise to relative differences in the electrical conduction properties of the detection circuits between different production batches, such that the impedances that are determined vary from one detector to another. In contrast, the access impedance of one track when compared with another track on the same detection circuit depends only on its shape (width, length), since the other parameters (thickness, nature and uniformity of the conductive material, . . . ) are constant for any one detection circuit.

Below, the term "sheet resistance" is used to designate the electrical resistance of an electrically conductive thin film that is uniform in its nature and in its thickness. Sheet resistance is related to thickness and to resistivity by the following formula $\rho = R_s \cdot e$, where e is the thickness, $\rho$ is the resistivity, and $R_s$ is the sheet resistance. Sheet resistance is expressed in Ohm·☐ Or Ohm/☐ (ohm square or ohms per square). Unlike resistivity, sheet resistance is usually obtained by direct measurement with tooling having four points, or by contactless measurement. Resistivity is calculated from sheet resistance and from thickness. Specifically, for conductive oxides such as ITO or AZO or for very thin metal layers, or for non-uniform layers such as conductive inks, resistivity can vary considerably as a function of the deposition process, and even from one batch to another, and it may be different from the resistivity of the pure material.

Sheet resistance is thus constant for a given detection circuit since the conductive film is uniform and of constant thickness, and the impedance of a track can be calculated knowing its shape and its sheet resistance as measured.

Thus, the invention provides a dermatoglyph detector comprising a detection circuit and an electronic processor unit, the detection circuit including an electrically conductive thin film in which there are formed both electrodes that are arranged to come into contact with the skin of a portion of a human body and also conductive tracks connecting the electrodes to the processor unit, the processor unit being arranged to determine electrical characteristics of the body portion extending between each pair of electrodes in contact with the skin, and to execute a computer program for acting on the basis of the determined electrical characteristics to distinguish between an authentic body portion and a fake body portion. The detection circuit includes at least two track segments of different shapes each extending between two calibration terminals so as to present an impedance ratio that is not equal to unity.

The calibration track, which forms part of the detection circuit, presents the same electrical conduction properties as the remainder of the detection circuit. Measuring the impedance of the calibration track makes it possible to determine its sheet resistance and to take account of the electrical conduction properties of the conductive tracks when determining the impedance of the body portion. The invention thus makes it possible to reduce the sensitivity of measurements to disparities between detectors so as to make performance more uniform in between detectors and also so as to measure identically between different measurement points of a given detector so as to make overall performance better by having measurements that are more accurate since the processing algorithm is made independent of the hardware structure of the detector.

The invention also provides a method of calibrating such a detector.

Other characteristics and advantages of the invention appear on reading the following description of particular, nonlimiting embodiments of the invention.

BRIEF DESCRIPTION OF THE DRAWINGS

Reference is made to the accompanying drawings, in which.

DETAILED DESCRIPTION OF THE INVENTION

Figure 1:
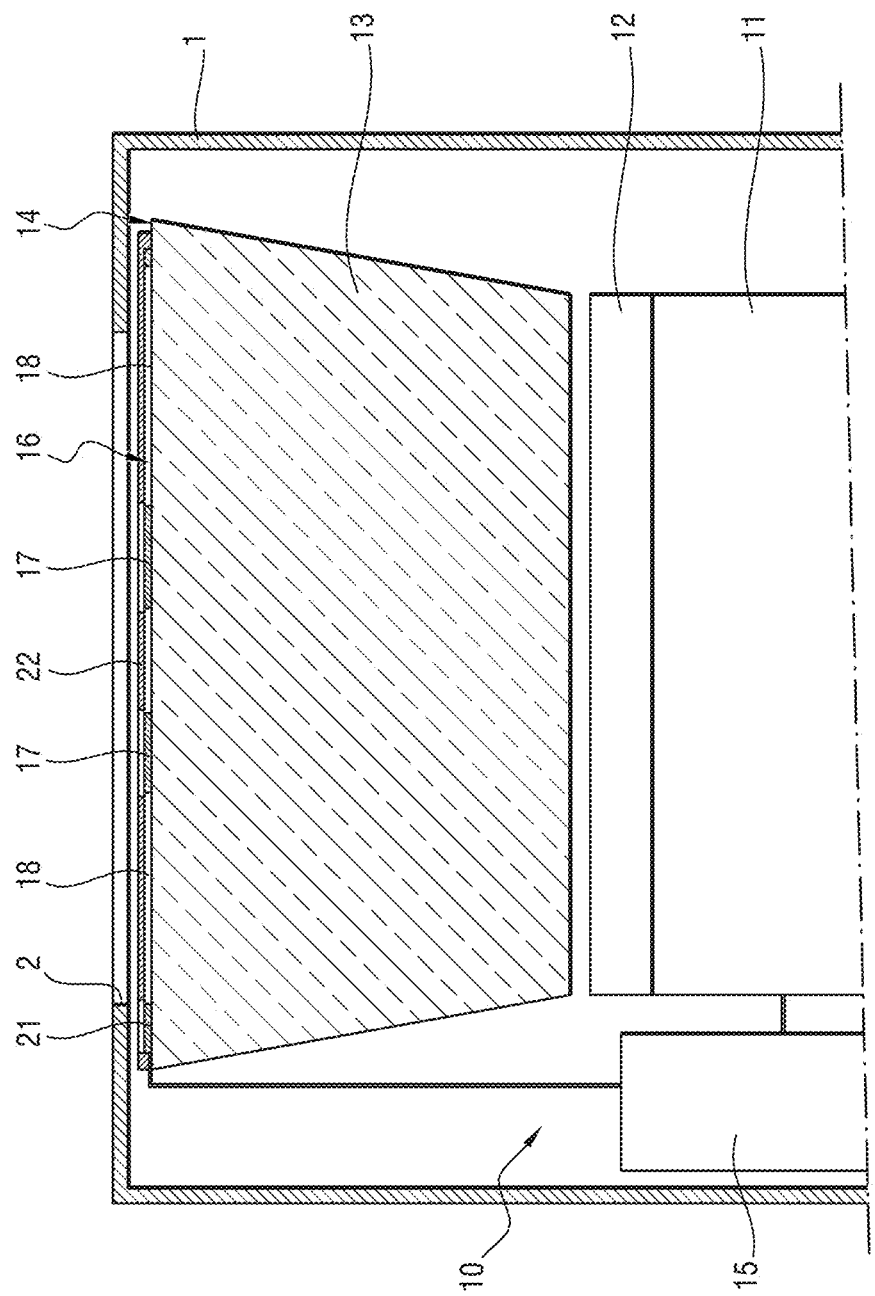
FIG. 1 is a diagrammatic section view of a dermatoglyph detector of the invention.

The invention is described with reference to a dermatoglyph detector used for biometric recognition based on fingerprints.

With reference to the figures, the detector of the invention comprises a housing 1 in the form of a box enclosing a biometric sensor given overall reference 10.

The biometric sensor 10 comprises a camera 11 having a lens 12 arranged behind an optically transparent element 13 with a surface 14 serving as a bearing surface for a finger of a candidate for biometric recognition. In this example, the transparent optical element 13 is a prism, but it could be a window. The window may be made of any transparent or translucent material such as glass, polycarbonate, or by polymethylmethacrylate. The camera is connected to an electronic processor unit 15 comprising a processor and memory containing a computer program, itself known, having instructions arranged to perform a biometric recognition method seeking to capture images of the figure and to extract biometric characteristics therefrom for comparison with reference biometric characteristics.

Figure 2:
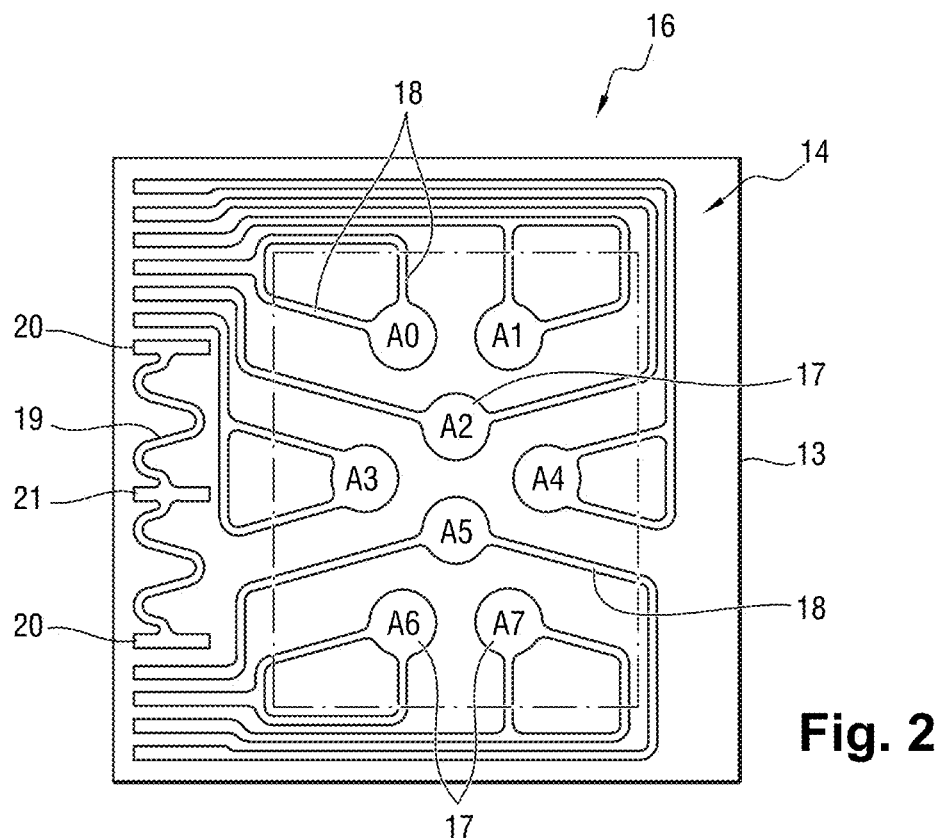
FIG. 2 is a diagrammatic plan view of a detection circuit in a first embodiment of the invention.
Figure 3:
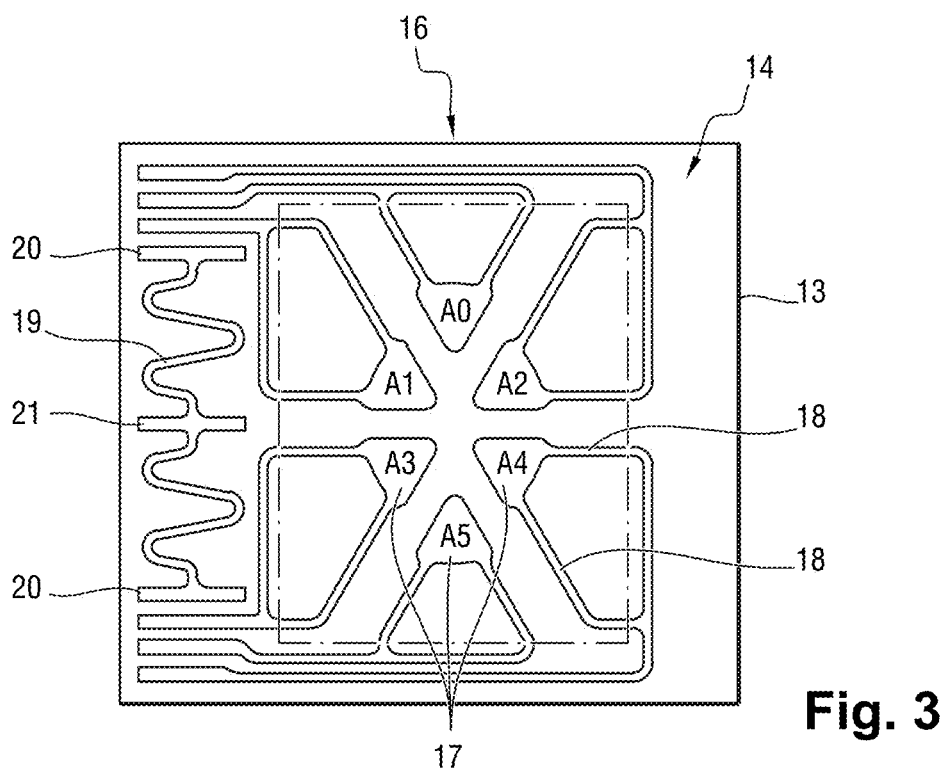
FIG. 3 is a diagrammatic plan view of a detection circuit in a second embodiment of the invention.

An electronic fraud detection circuit, given overall reference 16, extends over the surface 14 of the optical element 13. The detection circuit 16 is formed by an electrically conductive thin film defining a pattern comprising detection electrodes 17, each connected by one or two detection tracks 18 to the electronic processor unit 15. These detection electrodes 17 are to come into contact with the skin of the finger that is to have its image captured by the camera 11. In FIG. 2, the detection electrode 17 are circular in outline, whereas in FIG. 3, the detection electrodes 17 are triangular in outline. The electronic processor unit 15 is also arranged to execute a computer program for distinguishing between an authentic finger and a fake finger from at least one impedance as measured by means of the detection circuit 16. The principle of this program is itself known, and it makes use of an impedance model.

The thin film forming the detection circuit 16 also has a calibration track 19 with two ends, each provided with a respective end calibration terminal 20. The calibration track 19 is also provided with an intermediate calibration terminal 21, in this example situated halfway between the end calibration terminals 20: the calibration track segments 19 connecting the intermediate calibration terminal 21 to the end calibration terminals 20 are identical in length. The calibration track 19 is of known shape (length and width; while thickness is the same for all of the detection circuit, so it can be ignored). In this example, the calibration track 19 is in the shape of an undulating line of known length, specifically of identical length, on either side of the intermediate calibration terminal 21.

The calibration track 19 is connected to nothing other than the terminals 20 and 21. The calibration track 19 and the calibration terminals 20 and 21 are manufactured at the same time, out of the same material, with the same manufacturing tolerances, and under the same manufacturing conditions as the detection tracks 18 and the detection electrodes 17. The sheet resistance of the calibration track 19 is thus identical to the sheet resistance of the detection tracks 18 and of the electrodes 17. The electrical properties of the calibration track 19 and of the calibration terminals 20 and 21, and in particular their impedance, are representative of the electrical properties of the detection tracks 18 and of the detection electrodes 17, and in particular their impedance. In other words, since the shape of the calibration track 19 is known and since the resistance of a track is equal to the product of the length L of the track divided by the width l of the track and multiplied by the sheet resistance $R_s$:

$$R = R_s \cdot \frac{L}{l},$$

the calibration track can be used for calculating the sheet resistance and for extrapolating the impedance of any other track of the detection circuit (since it is assumed that the conductive film is uniform both in thickness and in nature over the entire surface area of the circuit, and thus that its sheet resistance is constant over all of the detection circuit, while the widths and the lengths are determined by the design of the detection circuit).

In this example, the thin film forming the detection circuit 16 is made by depositing a layer of indium tin oxide (ITO) on the surface 14. This layer is sufficiently thin to be transparent. More generally, the thin film may comprise one or more layers and may be made using additive methods (printing and/or depositing through a mask) or subtractive methods (depositing over the entire surface and then etching or ablating). The thin film may be constituted by a conductive metal oxide (indium and tin oxide or ITO, indium and zinc oxide or IZO, aluminum-doped zinc oxide or AZO) or by transparent conductive ink (silver nano wires) or indeed by metal grids presenting wires of width typically lying in the range 3 μm to 5 μm (grids made of titanium, aluminum, molybdenum, silver, platinum, . . . ). A plurality of layers may be stacked, possibly with different patterns (e.g. a layer of silver presenting low resistivity in the form of a grid and a layer of ITO presenting good mechanical strength and chemical resistance in the form of wide tracks with flat zones for the electrodes).

The tracks 18 and 19 are covered in a thin layer 22 of electrically insulating material that leaves the detection electrodes 17 and the calibration terminals 20 and 21 uncovered. In this way, when a finger is applied to the surface 14, some of the detection electrodes 17 come into contact with the skin of the finger, while none of the detection tracks 18 comes into contact with the skin of the finger.

The surface 14 extends facing a top opening 2 in the housing 1. More precisely, the detection electrodes 17 and the major part of the detection tracks 18 are situated in the top opening 2, while the calibration track 19 and the terminals 20 and 21 extend under a rim of the housing 1 bordering the top opening 2. More precisely, all of the terminals are protected by the housing 1.

There follows a description of the operation of the detector of the invention.

In order to begin a recognition operation, a candidate for recognition must apply a finger against the surface 14. Doing this puts the skin of the finger into contact with some of the detection electrodes 17. The electronic processor unit 15 is programmed to apply a voltage to the ends of the tracks in order to measure the current flowing between each of the pairs of detection electrodes 17 in contact with the finger and the conductive tracks connecting the electrodes to the detection circuit, and to deduce therefrom the impedance of each of the links thus constituted by a respective pair of detection electrodes 17, the finger portion between the two detection electrodes 17, and the detection tracks 18 connected to the detection electrodes 17. The impedances obtained are compared with the impedance model in order to determine whether the finger placed on the surface 14 is an authentic finger or a decoy or a fake finger.

If the finger is considered to be authentic, the electronic processor unit 15 causes the camera 11 to capture an image from which biometric characteristics (also known as "minutiae") are extracted by processing that is itself known. In a variant, biometric capture may be performed in parallel with detecting fraud.

If the finger is considered to be fake, the electronic processor unit 15 issues a warning.

As mentioned above, the impedances that are measured are the impedances of links that are constituted by respective pairs of detection electrodes 17, by the finger portion between the two detection electrodes 17, and by the detection tracks 18 connected to the detection electrodes 17.

In order to enable fake finger detection to be as reliable as possible, it is therefore necessary to know the impedances of the conductive tracks 18 and to take those impedances into account in the impedance model, or to correct the measurement impedances as a function of the impedances of the conductive tracks 18 prior to comparing the corrected impedances with the model. It is also necessary to know the (parallel) impedances of the measurement electronics to which the tracks of the detection circuit 16 are connected (as measured using "open circuit" measurements).

To do this, a calibration operation is usually provided, which is performed in this example by an operator, but which could equally well be performed by an automatic machine.

The operator performs the following actions:
removing the housing 1 in order to access the terminals 20 and 21;
connecting an impedance measurement circuit to the terminals 20 and 21 of the calibration track 19;
measuring both a first impedance and a second impedance of the calibration track, the first impedance being measured using a calibration terminal that is not used for measuring the second impedance; and
updating the program of the electronic processor unit to take the first and second measured impedances into account.

In this example, the first impedance $Z_1$ is measured between the intermediate calibration terminal 21 and one of the two end calibration terminals 20, and the second impedance $Z_2$ is measured between the two end calibration terminals 20.

The first impedance $Z_1$ is a combination of:
the impedance $Z_{cal}$ of the segment of the calibration track 19 extending between the intermediate calibration terminal 21 and said end calibration terminal 20; and
a parallel impedance $Z_{parallel}$ that is the impedance of the measurement circuit itself (resistances of the printed circuit, decoupling capacitances, inductances, protections against electrostatic discharges, switches for selecting the active tracks), this impedance is in parallel with the impedance that is to be measured, whence its name.

The second impedance $Z_2$ is a combination of:
the impedance $2Z_{cal}$ of the calibration track 19 between the end calibration terminals 20 (since the intermediate calibration terminal 21 is halfway between the two end calibration terminals 20, $Z_1$ comprises $Z_{cal}$ and $Z_2$ comprises $2Z_{cal}$); and
a parallel impedance $Z_{parallel}$, which is identical to the parallel impedance presence in the first impedance $Z_1$.

It is then possible to write:

$$Z_{cal} = \frac{Z_1 Z_2}{2*(Z_2 - Z_1)}$$

The parallel impedance $Z_{parallel}$ can be determined from an open circuit measurement.

Knowing the shape of the tracks, the impedance $Z_{cal}$ is used to calculate the resistance of the tracks $R_{track}$.

It is then possible to extract from the measured impedances $Z_{tot}$, both the resistance of each of the tracks and also the parallel impedance, in order to obtain the impedance of the finger $Z_{finger}$.

More precisely, the following is obtained:

$$Z_{finger}(f) = \frac{Z_{tot}(f)(Z_{parallel}(f) + R_{track}) - R_{track}}{Z_{parallel}(f) - Z_{tot}(f)}$$

Specifically, and in order to discriminate more accurately (some impedances being highly non-linear at certain frequencies), the impedance measurements are performed at different alternating current (AC) frequencies $f$ and the impedance model takes these different frequencies into account.

The operator thus needs to input the impedance $Z_{cal}$ as a parameter for the discrimination program executed by the electronic processor unit 15 in order to enable it to perform the above calculations. It is equally possible to perform measurements at certain frequencies only and then to extrapolate the impedances for other frequencies, e.g. using a theoretical electronic model as a function of frequency.

By way of example, the calibration operation is performed for the first time in the factory, when the detector is manufactured, and thereafter it is performed when performing maintenance operations.

The calibration operation may equally well be performed periodically, or if the detector detects an abnormally high number of fake fingers. The electronic processor unit 15 can thus be arranged to issue a warning when the fake finger detection rate exceeds a predetermined threshold.

In a second embodiment of the detector, the calibration terminals 20 and 21 of the calibration track 19 can be connected by conductors to the electronic processor unit 15, and the electronic processor unit 15 is arranged to measure the first impedance and the second impedance of the calibration track 19 so as to be capable, on its own, and automatically, of performing the calibration operation, e.g. periodically, each time the machine is started, or whenever the fake finger detection rate exceeds a predetermined threshold.

In order to measure the parallel impedance $Z_{parallel}$, an open circuit measurement is performed, and it is important that no external conductive element is in contact with the detection circuit 16. When a calibration operation is performed automatically by the electronic processor unit 15, it is possible to use the camera 11 to capture an image and to perform image processing in order to verify that no external element is resting on the surface 14.

It should be observed that in all of the above-described circumstances, there are at least three calibration terminals, namely two end the terminals 20 and one intermediate terminal 21, with: a first calibration track segment extending between one the end terminals 20 and the intermediate terminal 21; and a second calibration track segment incorporating the first segment and extending from one of the end terminals 20 to the other one of the end terminals 20.

Naturally, the invention is not limited to the embodiments described and covers any variant coming within the ambit of the invention as defined by the claims.

In particular, the calibration track may be of some other shape, and in particular its shape may be rectilinear, crenellated, sawtooth, . . . . It may also extend in part around the detection circuit, or on the contrary, it may be arranged at some location other than the periphery.

The calibration track need not be masked by the housing.

The number and the shape of the calibration terminals may differ from the number and the shape described and shown. The intermediate terminal may be located at any point along the calibration track providing the distances between it and the end terminals are known. The calibration track could equally well comprise two separate track segments with known section and length ratios so as to be able to extrapolate their resistance ratios. The term "two separate track segments" should be understood as meaning that none of the calibration terminals of the first segment is in common with any of the calibration terminals of the second segment: there are thus four calibration terminals and not three as in the embodiments shown in the figures.

The first calibration track segment may present an area that is $\alpha$ times the area of the second calibration track. The impedance $Z_1$ of the first segment is then equal to $\alpha \cdot Z_2$ where $Z_2$ is the impedance of the second segment. As a result, the impedance $Z_{cal}$ of the calibration segment is given by:

$$Z_{cal} = \frac{(\alpha - 1)Z_1 Z_2}{\alpha * (Z_2 - Z_1)}$$

The detector may optionally include a biometric sensor member. The sensor member may be optical, capacitive, thermal, or other.

The detector can be used with any portion of the body that presents dermatoglyphs, such as the palm of the hand.

Other materials can be used for making the detection circuit, e.g. a material based on graphene.

The open circuit measurement may be performed in various different ways:
- by taking a measurement automatically without connecting the internal measurement circuit to any of the measurement tracks (e.g. using switches controlled by software, as when connecting to one track or another); or
- by connecting the internal measurement circuit to any two non-closed tracks, providing it is certain that nothing is placed thereon (which is possible during manufacture when operating under supervision). This solution should be used only when the measurement circuit does not have enough available inputs.

It should be observed that the detector can take the parallel impedance measurements again on its own, on the utilization site, without any risk and without any need to check whether of an object is present placed on the detection circuit, each time the detector is started or by using a self-recalibration procedure that is scheduled or initiated to resolve warnings or to correct a large difference in measurements.

The invention claimed is:

1. A dermatoglyph detector comprising a detection circuit and an electronic processor unit, the detection circuit including an electrically conductive thin film in which there are formed both electrodes that are arranged to come into contact with the skin of a portion of a human body and also conductive tracks connecting the electrodes to the processor unit, the processor unit being arranged to determine electrical characteristics of the body portion extending between each pair of electrodes in contact with the skin, and to execute a computer program for acting on the basis of the determined electrical characteristics to distinguish between an authentic body portion and a fake body portion, wherein the detection circuit includes at least two track segments of different shapes each extending between two calibration terminals and having respective impedances of the track segments, the track segments having relative to each other by their geometry an impedance ratio different from one.

2. The dermatoglyph detector according to claim 1, wherein the track segments form parts of a common calibration track connecting together two end calibration terminals and an intermediate calibration terminals.

3. The dermatoglyph detector according to claim 1, wherein the intermediate calibration terminals are arranged halfway between the end calibration terminals.

4. The dermatoglyph detector according to claim 1, wherein the track segments are separate from each other.

5. The dermatoglyphdetector according to claim 1, wherein the electronic processor unit is connected to the calibration terminals and is arranged to determine a magnitude representative of the impedance of the track segments and to take account of that magnitude when executing a computer program.

6. The dermatoglyphdetector according to claim 1, wherein the track segments are located at the periphery of the detection circuit.

7. The dermatoglyph detector according to claim 3, comprising a housing including a window over the detection circuit, the housing including a portion covering the track segments.

8. The dermatoglyph detector according to claim 1, wherein at least one of the track segments is undulating in shape.

9. A method of calibrating a dermatoglyph detector according to claim 1, the method comprising the steps of:
   connecting an impedance measurement circuit to the terminals of the track segments;
   measuring the impedance of each track segment; and
   updating the program of the electronic processor unit to take the measured impedances into account.

10. The method according to claim 9, wherein the updating is performed by calculating sheet resistance from the impedances of the track segments and from their shapes, and by calculating the resistance of each of the tracks of the detection circuit from the track shapes and from the sheet resistance.

11. The method according to claim 10, wherein as a result of their shapes, the track segments present relative to each other an impedance ratio $\alpha$, with the impedance $Z_{cal}$ being given by:

$$Z_{cal} = \frac{(\alpha - 1)Z_1 Z_2}{\alpha * (Z_2 - Z_1)}$$

where $Z_1$ and $Z_2$ represent the respective impedances of the track segments.

12. The method according to claim 9, comprising an open circuit impedance measurement to measure the parallel impedance of measurement electronics to which the tracks of the detection circuit are connected.

13. The method according to claim 9, wherein the track segment impedance measurements are performed at different AC frequencies.

14. The method according to claim 10, wherein the impedance of a finger $Z_{finger}(f)$ at a given frequency f is equal to:

$$Z_{finger}(f) = \frac{Z_{tot}(f)(Z_{parallel}(f) + R_{track}) - R_{track}}{Z_{parallel}(f) - Z_{tot}(f)}$$

where
- $Z_{tot}(f)$ is the total impedance measured at the given frequency f;
- $Z_{parallel}(f)$ is the parallel impedance measured at the given frequency f;
- $R_{track}$ is the resistance of the tracks of the detection circuit.

\* \* \* \* \*